US008320397B2

(12) United States Patent
Desai et al.

(10) Patent No.: US 8,320,397 B2

(45) Date of Patent: Nov. 27, 2012

(54) BACKOFF ADJUSTMENT METHOD FOR MAC SYSTEM

(75) Inventors: Uday Babulal Desai, Mumbai (IN); Shabbir Nomanbhai Merchant, Mumbai (IN); Bhoomek D. Pandya, Mumbai (IN)

(73) Assignee: Indian Institute of Technology Bombay, Mumbai (IN)

(*) Notice: Subject to any disclaimer, the term of this patent is extended or adjusted under 35 U.S.C. 154(b) by 294 days.

(21) Appl. No.: 12/755,718

(22) Filed: Apr. 7, 2010

(65) Prior Publication Data

US 2011/0249568 A1 Oct. 13, 2011

(51) Int. Cl.
*H04L 12/413* (2006.01)
*G06F 15/16* (2006.01)

(52) U.S. Cl. ........................................ 370/445; 709/235

(58) Field of Classification Search ........................ None
See application file for complete search history.

(56) References Cited

U.S. PATENT DOCUMENTS 6,240,460 B1 * 5/2001 Mitsutake et al. ............ 709/235

OTHER PUBLICATIONS

IEEE Std 802-11, IEEE Standard for Wireless LAN Medium Access Control (MAC) and Physical Layer (PHY) Specifications [ISO/IEC 8802-11: 1999], 1999 Edition.

Pang et al., Design of an Effective Loss-Distinguishable MAC Protocol for 802.11 WLAN, IEEE Communications Letters, 2005.

Pandya et al., Loss Differentiation Based Back Off Strategy for Correlated Channels in 802.11, Wireless VITAE, 2009.

Bianchi, Performance Analysis of the IEEE 802.11 Distributed Coordination Function, IEEE JSAC, vol. 18, No. 3, pp. 535-547, Mar. 2000.

Pang et al., Improvement of WLAN Contention Resolution by Loss Differentiation, IEEE Transactions on Wireless Communications, vol. 5, No. 12, Dec. 2006.

Cali et al., IEEE 802.11 Protocol: Design and Performance Evaluation of an Adaptive Backoff Mechanism, IEEE Journal on Selected Areas in Communications, vol. 18, No. 9, Sep. 2000.

Malone et al., MAC Layer Channel Quality Measurement in 802.11, IEEE Communications Letters, vol. 11, Issue 2, 2007, pp. 143-145.

Shamy et al., A Study on the Binary Exponential Backoff in Noisy and Heterogeneous Environment, Lecture Notes in Computer Science, Mobile Ad-hoc and Sensor Networks, Third International Conference, MSN 2007, Beijing, China, Dec. 12-14, 2007.

* cited by examiner

*Primary Examiner* — Clemence Han

(74) *Attorney, Agent, or Firm* — Maschoff Gilmore & Israelsen

(57) ABSTRACT

In some examples, a method includes transmitting frames over a wireless channel after a first backoff period has elapsed. The method also includes estimating a channel condition of the wireless channel over a plurality of time slots. The method also includes determining, in case of an unsuccessful transmission of the frames, whether the unsuccessful transmission is attributed to a frame collision. The method also includes determining a second backoff period based on at least the estimated channel condition if the unsuccessful transmission is not attributed to a frame collision.

23 Claims, 6 Drawing Sheets

400

Channel Observation — 402

Frame Transmission Error — 404

Distinguish Cause Of Frame Error — 406

Channel Condition Estimation — 408

Backoff Period Determination — 410

Re-transmission Using New Backoff Period — 412

BACKOFF ADJUSTMENT METHOD FOR MAC SYSTEM

CROSS-REFERENCE TO RELATED APPLICATIONS

None.

BACKGROUND

Media Access Control (MAC) is a widely-accepted protocol for wireless communication systems that is designed to allow a plurality of communication devices to simultaneously access shared-medium. In some wireless systems, such as the IEEE 802.11, MAC employs Carrier Sense Multiple Access With Collision Avoidance (CSMA/CA) to minimize packet collisions.

In the CSMA/CA system, each station (STA) is required to listen to the channel to see whether the channel is busy or idle before sending its packets, wherein the STA is allowed to send its packets only when the channel is determined to be idle. Otherwise, a backoff mechanism is invoked. That is, if the channel is determined not to idle, i.e., busy, or there is a packet collision on the channel, then the STA sets a backoff value in its backoff counter that is randomly selected from a contention window. The backoff value is decremented by one time slot and the STA is allowed to retransmit its prior packets when the backoff value is decremented to zero.

However, there is a possibility that a plurality of STAs set a same backoff period in each backoff counter, which results in packet collisions on the channel. To reduce the possibility of continuous packet collisions, CSMA/CA is designed to double the earlier contention window every time a packet collision occurs. Thus, the contention window is increased in a exponential manner every time a packet retransmission is unsuccessful, which can degrade the throughput of the system because stations have to serve a longer backoff period even if unsuccessful transmission occurs due to a channel error.

SUMMARY

The embodiments herein relate to a method comprising: transmitting frames over a wireless channel after a first backoff period has elapsed; estimating a channel condition of the wireless channel over a plurality of time slots; determining, in case of an unsuccessful transmission of the frames, whether the unsuccessful transmission is attributed to a frame collision; and if the unsuccessful transmission is not attributed to a frame collision, then determining a second backoff period based on at least the estimated channel condition.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
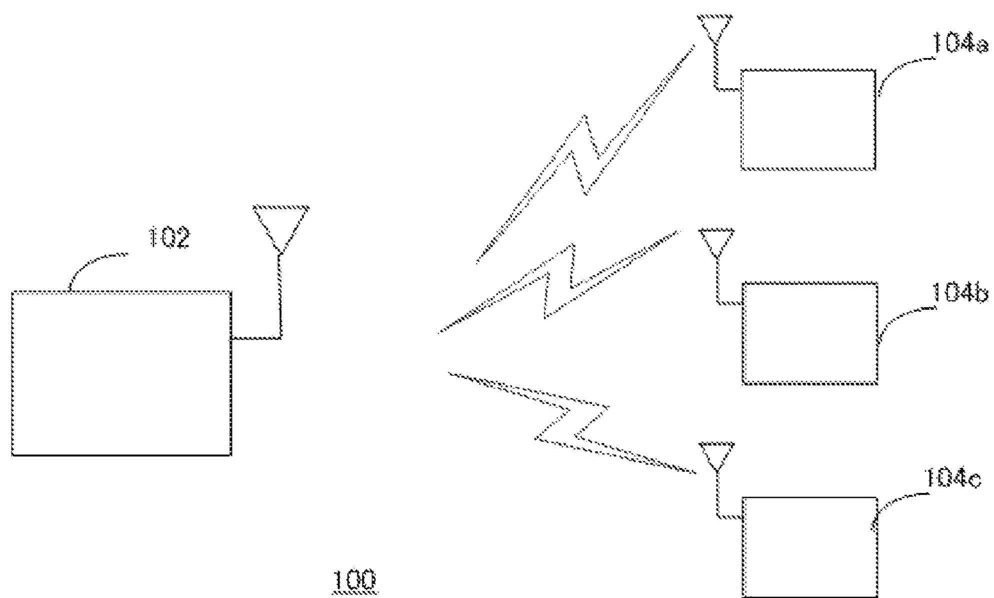
FIG. 1 shows an illustrative embodiment of network architecture in accordance with various aspects of the present disclosure.

Example embodiments relate to a method comprising transmitting frames over a wireless channel after a first backoff period has elapsed; estimating a channel condition of the wireless channel over a plurality of time slots; determining, in case of an unsuccessful transmission of the frames, whether the unsuccessful transmission is attributed to a frame collision; and if the unsuccessful transmission is not attributed to a frame collision, then determining a second backoff period based on at least the estimated channel condition. Example embodiments also relate to a computer readable medium storing computer executable instructions, the instruction when executed configuring one or more processors to perform several functions.

Example embodiments also relate to a system comprising a mobile station associated with a controller for a wireless communication, the mobile station comprising one or more processors configured to transmit frames over a wireless channel after a first backoff period has elapsed; estimate a channel condition of the wireless channel over a plurality of time slots; determine, in case of an unsuccessful transmission of the frames, whether the unsuccessful transmission is attributed to a frame collision; and if the unsuccessful transmission is not attributed to a frame collision, then determine a second backoff period based on at least the estimated channel condition.

"Channel error" can occur when there is a packet loss or an unsuccessful transmission of packets not due to collision between packets of the contending stations, but because of poor channel conditions.

Contention window: A range of value from which a backoff period is chosen randomly.

Backoff period: A period of time set to a counter in a station. The station has not been allowed to transmit any frames over the channel until the backoff period is decremented to zero.

"Packet" and "frame" can be used interchangeably.

Access Point (AP): Any entity that has a station (STA) functionality and provides access to the distribution services, via the WM for associated STAs.

Mobile Station (MS): A type of STA that uses network communications while in motion.

Example embodiments relate to a method and system that provide an enhanced backoff strategy wherein a backoff period may be determined based on an estimated channel condition if a transmission error is not attributed to a frame collision. The backoff period to be determined based on an estimated channel condition may be used by a mobile station in a wireless communication system that employs collision avoidance mechanism such as CSMA/CA. The mobile station estimates a channel condition over a plurality of time slots. In the event that a frame transmission from the mobile station is unsuccessful due to a channel error or any other cause other than a frame collision, a subsequent (second) backoff period to be used for retransmission of the unsuccessful frames may be determined based on the estimated channel condition. The cause of the unsuccessful transmission may be determined based on either the estimated channel condition or a received negative acknowledgement frame. Channel error may occur when a receiving station is far from a transmitting station and, therefore, signal strength is poor. Poor signal strength may also be caused by an inadequate antenna pattern. Furthermore, channel error may be caused by, for example, certain type of interference in the same frequency band.

In an example embodiment, a channel error is detected in each of the plurality of time slots and wherein the channel condition is estimated by computing the mean of the lengths of consecutive error time slots and the variance of the mean. The backoff time may be calculated further based on a probability of channel error over the plurality of slots. The number of the plurality of time slots may be modified according to the estimated probability of channel error.

In an example embodiment, if it is determined that the unsuccessful transmission is attributed to a frame collision, then the subsequent backoff period may be determined based on a contention window that would be increased in an exponential manner for each retransmission.

In this example embodiment, the mobile station may distinguish a cause of an unsuccessful frame transmission and may determine a subsequent backoff period based on an estimated channel condition in case that the attempt to transmit earlier frames is unsuccessful due to a reason other than a packet collision. Although unsuccessful transmissions due to a channel error does not represent congestion of frame transmissions, the conventional strategy doubles an earlier contention window. If a backoff period for retransmission is determined based on the doubled contention window, mobile stations have to serve such a long backoff period without congestion. In addition, according to this conventional mechanism the mobile stations can fail to transmit frames due to a channel error because the mobile stations have to serve a backoff period determined based on the doubled contention window.

In an example embodiment, in case a transmission error occurs due to a channel error, a new backoff period is determined based on an estimated channel condition rather than a doubled contention window, which can provide an improved throughput of the wireless communication system. In another example embodiment, a mobile station that unsuccessfully transmits frames due to a channel error does not have to serve a longer backoff period determined based on a doubled contention window.

FIG. 1 illustrates an example architecture of a system 100 in accordance with various aspects of the present disclosure. The system 100 may include a controller 102 configured to wirelessly communicate with associated mobile stations 104$a$, 104$b$, and 104$c$ (hereinafter "mobile station 104" or "MS 104"). MS 104 may communicate with controller 102 using various protocols that employ CSMA/CA, including, for example, the IEEE 802.11a/b/g/e, IEEE 802.11p, IEEE 802.11s for sensor networks for a vehicular communication, IEEE 802.15.4 PAN, and IEEE 802.3 protocols. Controller 102 may be configured as an Access Point (AP) in the IEEE 802.11 standard.

Figure 2:
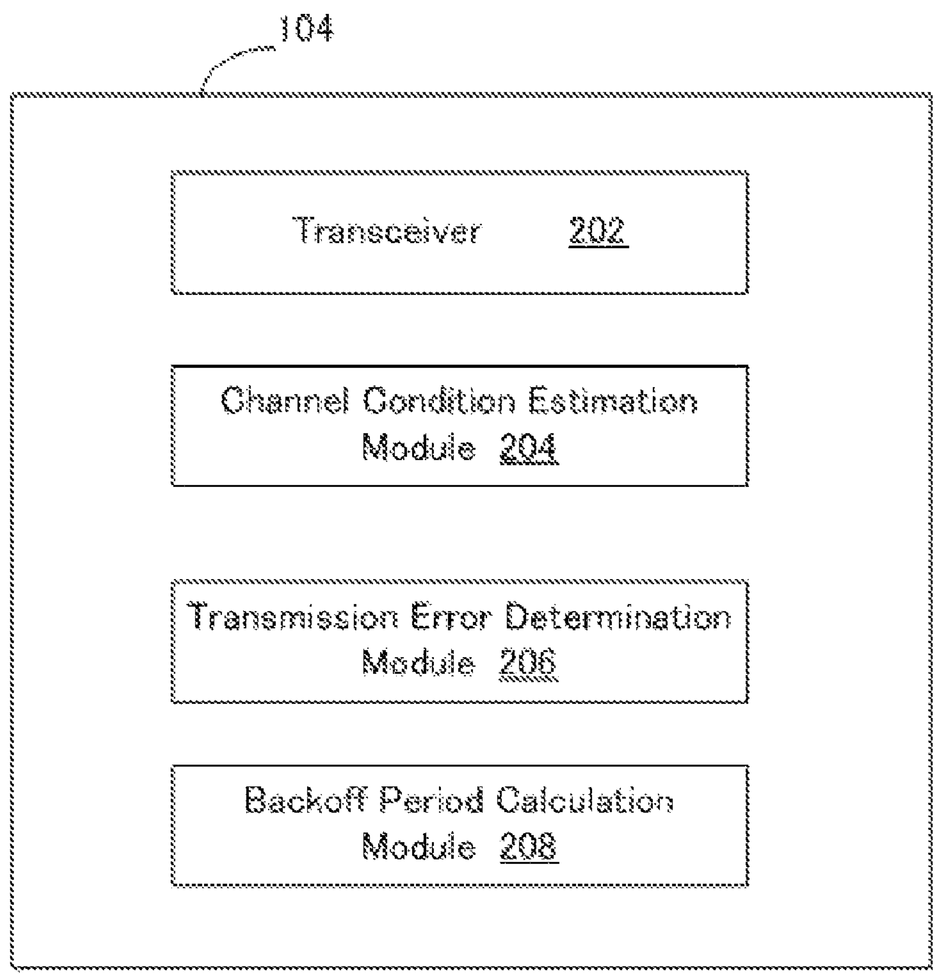
FIG. 2 shows an example embodiment of a block diagram illustrating an example mobile station in accordance with various aspects of the present disclosure.

FIG. 2 is a block diagram illustrating an example MS 104 in accordance with various aspects of the present disclosure. MS 104 may include a transceiver 202, a channel condition estimation module 204, transmission error determination module 206, and backoff period calculation module 208.

Transceiver 202 may transmit to and receive communications from controller 102 via the wireless channel. For example, transceiver 202 may transmit various types of MAC frames to controller 102 after serving a backoff period that may be computed according to various aspects of this disclosure. Controller 102, upon successful receipt of the transmitted frames from MS 104, may send a reply ACK frame to MS 104 to signify successful transmission. If controller 102 receives the frames from MS 104 with an error, then controller 102 may generate a negative ACK (NACK) frame to notify unsuccessful transmission of the frames. The NACK frame may be configured to include in its field an error message that indicates whether the transmission error is attributed to a frame collision or channel error. Upon the receipt of the NACK frame including the error message, MS 104 may recognize that the attempt to transmit the frames was unsuccessful and may determine whether the failure transmission occurred due to a frame collision or channel error.

According to various example embodiments, channel condition estimation module 204 may be configured to listen to the wireless channel for a predetermined observation interval. The observation interval includes a plurality of time slots. Thus, channel condition estimation module 204 may detect errors in received frames in each time slot. Whereas some of the received frames may be sent to the upper layers such as network or application layers for further processing, the other frames may be used for the error detection processing. Transmission error determination module 206 may determine whether the failure transmission occurred due to a frame collision or channel error such as for example an error message included in the received NACK. In another example embodiment transmission error determination module 206 may determine the cause of the transmission error based on the estimated channel condition, as further described below with reference to FIG. 5.

According to various example embodiments, if the transmission of the frames was unsuccessful due to a channel error, backoff period calculation module 208 may determine a next (second) backoff period to be used in re-transmitting the unsuccessful frames based on the observed channel condition.

Figure 3:
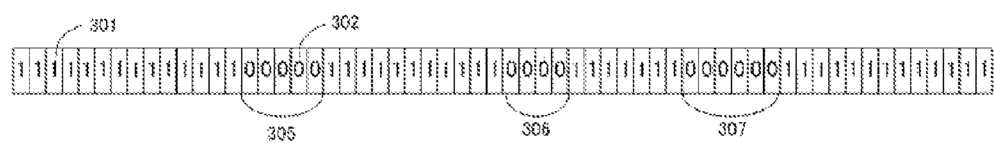
FIG. 3 shows an illustrative embodiment of observed channel condition over a plurality of time slots.

FIG. 3 illustrates an example of observed channel condition over 60 time slots. Although 60 is used in the example embodiment in FIG. 3, the number of time slots used to estimate the channel condition may be more or less than 60. Referring again to FIG. 3, in an example operation if MS 102 receives frames without any error in a particular time slot (e.g., time slot 301), then MS 102 determines that the channel condition is good during the particular time slot. In FIG. 3, the particular time slot determined to have a good channel condition is labeled "1." On the other hand, if MS 102 receives frames in a particular time slot with one or more errors (e.g., time slot 302), then MS 102 determines that the channel condition is bad during the particular time slot. In FIG. 3, the particular time slot determined to have a bad channel condition is labeled "0" indicating that the received frame is corrupted due to a channel error. The time slot labeled "0" may be herein referred to as "error time slot."

In an example embodiment, the channel condition estimation module 204 may distinguish the cause of the errors included in the received frames. For example, in case both of the header and data fields of the received frame are corrupted, it can be determined the error in the received frame is attributed to a frame collision. On the other hand, in case at least the header field is received correctly but the data field is corrupted, it may be determined that the error occurred due to a channel error because the header field is much shorter than the data field. In another example embodiment, channel condition estimation module 204 may distinguish the cause of a transmission error by using Request to Send/Clear to Send (RTS/CTS) mechanism. In this mechanism, if MS 102 receives both of a CTS message and an ACK message, channel condition estimation module 204 may determine the transmission is successful. If MS 102 receives only a CTS message but fails to receive an ACK message, channel condition estimation module 204 may determine that the transmission is unsuccessful due to a channel error. If MS 102 does not receive either CTS nor ACK messages, channel condition estimation module 204 may determine that the transmission is unsuccessful due to a frame collision.

According to various embodiments, channel condition estimation module 204 may estimate a channel condition based on, for example, an averaging length of consecutive error time slots. For example, the sequence of time slots illustrated in FIG. 3 includes 3 sets of consecutive error time slots 305-308: the first set 305 consists of 5 consecutive error time slots; the second set 306 consists of 4 consecutive error time slots; and the third set 307 consists of 6 consecutive error time slots. Channel condition estimation module 204 may compute the mean and variance of these lengths of the three sets of error time slots. In this example, the arithmetic mean of the three sets of error time slots is 5 and the variance of the mean is ⅔ (0.666 . . . ), which may be round up to the nearest integral number, i.e., 1, in this example. Alternatively, channel condition estimation module 204 may compute least mean squares and its variance. Using this mean and variance of the lengths of the consecutive error slots, backoff period calculation module 208 may determine a next (second) backoff period.

Figure 4A:
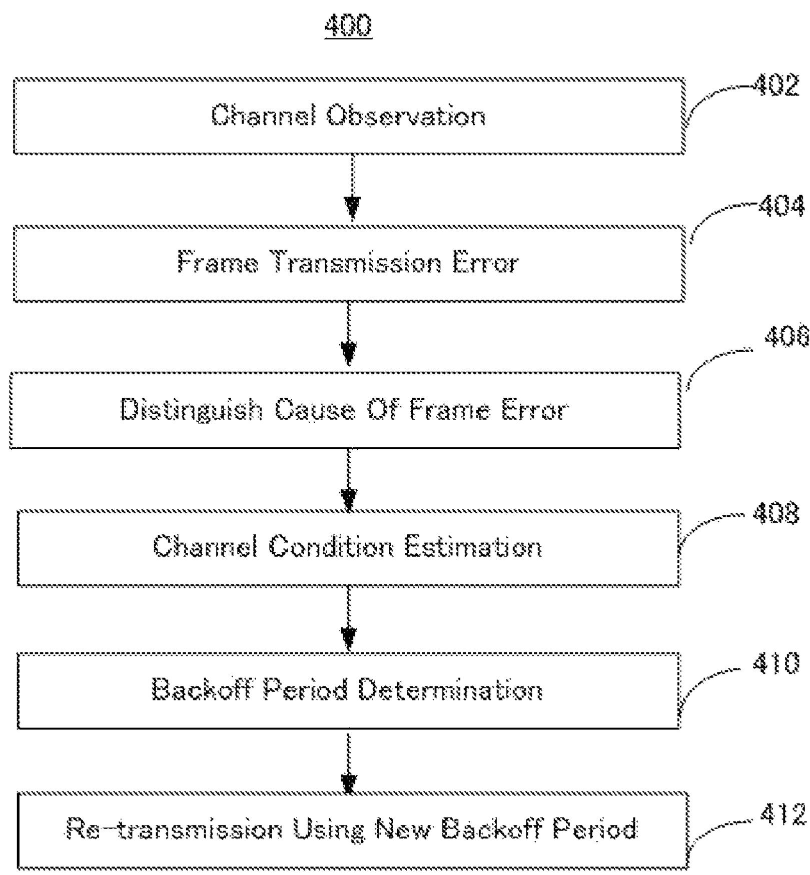
FIG. 4*a* shows an illustrative embodiment of an example process for re-transmission using new back-off period, including determining a backoff period.
Figure 4B:
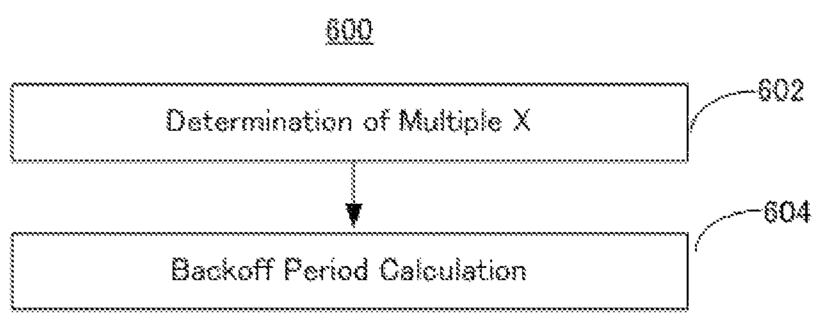
FIG. 4*b* shows an illustrative embodiment of example process for calculating a backoff period.

FIG. 4*a* is a flow diagram illustrating a non-limiting example process for re-transmission using new back-off period, including determining a backoff period. FIG. 4*b* is an example process for determining a backoff period. FIG. 4*b* is a flow diagram illustrating a non-limiting example process 600 for calculating a backoff period. In an example operation 602, a multiple X in the above equation is determined. The process shown and described by the illustrative flow diagram of FIG. 4*a* and FIG. 4*b* may be implemented using some or all of the system components described in detail above. In another embodiment, the operations illustrated in FIG. 4*a* and FIG. 4*b* may be performed in a different sequence, simultaneously. In another embodiment steps shown may be deleted and additional steps can be added.

Figure 5:
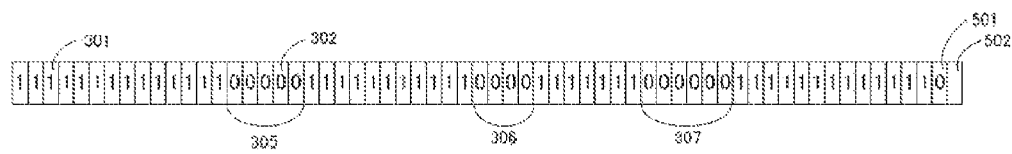
FIG. 5 shows an illustrative embodiment of observed channel condition over a plurality of time slots.

In an example operation 402, MS 104 continues to observe the channel condition and determines whether there is an error in each time slot. An example of observed channel condition is illustrated in FIG. 5. The first 60 time slots of the sequence in FIG. 5 are the same as the sequence shown in FIG. 3. Subsequent to the first 60 time slots, MS 104 has updated the sequence by adding observed time slot 501. In this example, MS 104 detects an error in time slot 501, and, therefore, time slot 501 is labeled 0. In an operation 404, MS 104 transmits frames in time slot 502 and receives, for example, a reply NACK from controller 102, including an error message indicating the attempt to transmit the frames is unsuccessful due to a channel error or frame collision.

In an operation 406, transmission error determination module 206 may determine whether the transmission failure is attributed to a frame collision or channel error based on, for example, the error message included in the received NACK. Alternatively, transmission error determination module 206 may determine whether the transmission failure is attributed to a frame collision or channel error based on the mean of the consecutive error time slots. In this embodiment, MS 104 has transmitted frames in time slot 502 which follows the error time slot 501. Given the mean of the consecutive error time slots is 5 as previously noted, it can be predicted the sequence of the consecutive error time slots starting time slot 501 would continue for 5 consecutive time slots. Based on this prediction, transmission error determination module 206 may determine that the transmission error in time slot 502 is due to a channel error.

If the cause of error transmission is determined to be a channel error, a channel condition estimation process can be invoked in an operation 408. In one embodiment, a channel condition is estimated by calculating the mean of the lengths of consecutive error time slots and the variance of the mean. As previously noted, in this example, the arithmetic mean of the lengths of the consecutive error time slots is 5 and the variance of the mean is 1. In an example embodiment, time slot 501 may be ignored when estimating a channel condition because time slot 501 is adjacent to the current time slot 502 and considered as a part of the current consecutive error time slots.

In an example operation 410, a backoff period for retransmission of the earlier frames is determined based on the calculated mean and variance. The backoff period may be determined, for example, by adding the mean of the lengths of consecutive error time slots to the variance of the mean multiplied by a particular multiple (=X). In an example embodiment, the backoff period for retransmission may be expressed by the following equation:

$$\text{Backoff period}=\text{mean}+X^{*}\text{variance},$$

where X represents a certain multiple which may be determined, for example, by subtracting the value representing the order of the time slot that is used for the unsuccessful transmission in the current set of error time slots from the mean of the lengths of consecutive error time slots.

In an example shown in FIG. 5, MS 102 transmitted the frames in time slot 502, which is the second time slot in the sequence of consecutive error time slots starting with time slot 501 and the mean of the consecutive error time slots is 5. As such, for example, X may be calculated by subtracting 2 from 5. Accordingly, the resulting value of X is 3. In an example operation 604 shown in FIG. 4*a*, a backoff period is calculated based on the determined value of X according to the equation as noted above. In this example shown in FIG. 5, the mean of the consecutive error time slots is 5 and the variance of the mean is 1. As such, the backoff period is calculated by adding the mean to X multiplied by the variance. In this example, the resulting backoff is calculated to be 8.

It should be noted that using the mean of the lengths of consecutive error time slots (i.e., 5 in this example) might not well work in some cases. For example, as illustrated in FIG. 5, the length of error time slot 307 is '6'. To address this situation, a multiple of the variance of the mean may be added to the mean of the error time slot lengths.

In various embodiments, X may be chosen from a set of predetermined values. For example, relatively lower value of X (e.g., X=1) may be chosen for a channel condition with higher error probability. On the other hand, relatively lower value of X (e.g., X=3), may be chosen for a channel condition with lower error probability. The value of the multiple represented by X may be chosen according to various algorithms.

After serving the calculated backoff period, the prior unsuccessful frames may be retransmitted in an operation 412. Thus, the backoff period for retransmission of the prior unsuccessful frames may be determined based on the estimated channel condition, which can facilitate enhanced data throughput of the wireless system and facilitates fair backoff time allocation for each mobile station. In particular, even if MS 104 is in a low mobility condition, the backoff period calculation according to an example embodiment is calculated based on estimated channel conditions which reflect high channel correlation between different time slots, which may achieve better data throughput of the wireless system as compared to conventional backoff mechanisms determined without considering channel correlation between time slots.

According to various embodiments, transmission error determination module 206 may update the sequence of the observed time slots by setting "0" in time slot 502 because it is determined that the cause of the unsuccessful frame transmission in time slot 502 is determined to be a channel error.

Although the above examples are described using the example set of observed 60 time slots, it should be noted that more or less time slots may be used or the number of time slots to be observed may be adjusted, for example, based on the probability of error slots over the observation interval. For example, if the ratio of the error slots in the observation interval exceeds a predetermined threshold (e.g., 40%), then the observation interval may be increased to a next higher level (e.g., 1000 time slots). The high probability of error slots may occur because of long fading. If the increased observation interval does not provide a good channel condition where the ratio of error time slots is less than the threshold, the observation interval may be repeatedly increased. Thus, in example embodiments, starting with a short period of the observation interval facilitates close approximation of the channel correlation if the channel changes quickly over the observation interval.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:

transmitting frames over a wireless channel after a first backoff period has elapsed;

estimating a channel condition of the wireless channel over a plurality of time slots;

determining, in case of an unsuccessful transmission of the frames, whether the unsuccessful transmission is attributed to a frame collision; and if the unsuccessful transmission is not attributed to a frame collision, then determining a second backoff period based on at least the estimated channel condition.

2. The method of claim 1, wherein determining whether the unsuccessful transmission is attributed to a frame collision is computed based on the estimated channel condition.

3. The method of claim 1, further comprising:

receiving a negative acknowledgement indicating the unsuccessful transmission of the frames, wherein determining whether the unsuccessful transmission is attributed to a frame collision is computed based on the received negative acknowledgement.

4. The method of claim 1, wherein if the unsuccessful transmission is attributed to a frame collision, then determining the second backoff period based on a contention window.

5. The method of claim 4, wherein the contention window is increased in an exponential manner.

6. The method of claim 1, further comprising detecting a channel error in one or more receiving frames in each of the plurality of time slots; and wherein the channel condition is estimated by computing the mean of the lengths of consecutive error time slots and the variance of the mean.

7. The method of claim 1, further comprising determining probability of channel error over the plurality of time slots.

8. The method of claim 7, wherein the backoff time is calculated further based on the probability of channel error.

9. The method of claim 7, wherein the number of the plurality of time slots is modified according to the probability of channel error.

10. A system comprising:

a mobile station associated with a controller for a wireless communication, the mobile station comprising one or more processors configured to:

transmit frames over a wireless channel after a first backoff period has elapsed;

estimate a channel condition of the wireless channel over a plurality of time slots;

determine, in case of an unsuccessful transmission of the frames, whether the unsuccessful transmission is attributed to a frame collision; and if the unsuccessful transmission is not attributed to a frame collision, then determine a second backoff period based on at least the estimated channel condition.

11. The system of claim 10, wherein whether the unsuccessful transmission is attributed to a frame collision is determined based on the estimated channel condition.

12. The system of claim 10, wherein the one or more processors are further configured to:

receive a negative acknowledgement indicating the unsuccessful transmission of the frames, wherein whether the unsuccessful transmission is attributed to a frame collision is determined based on the received negative acknowledgement.

13. The system of claim 10, wherein the one or more processors are further configured to:

if the unsuccessful transmission is attributed to a frame collision, then determine the second backoff period based on a contention window.

14. The system of claim 13, wherein the contention window is increased in an exponential manner.

15. The system of claim 10, wherein the one or more processors are further configured to detect a channel error in one or more receiving frames in each of the plurality of time slots; and wherein the channel condition is estimated by computing the mean of the lengths of consecutive error time slots and the variance of the mean.

16. A non-transitory computer readable medium storing computer executable instructions, the instructions when executed configuring one or more processors to perform the functions of:

transmitting frames over a wireless channel after a first backoff period has elapsed;

estimating a channel condition of the wireless channel over a plurality of time slots;

determining, in case of an unsuccessful transmission of the frames, whether the unsuccessful transmission is attributed to a frame collision; and if the unsuccessful transmission is not attributed to a frame collision, then determining a second backoff period based on at least the estimated channel condition.

17. The non-transitory computer readable medium of claim 16, wherein determining whether the unsuccessful transmission is attributed to a frame collision is computed based on the estimated channel condition.

18. The non-transitory computer readable medium of claim 16, further comprising:

receiving a negative acknowledgement indicating the unsuccessful transmission of the frames, wherein determining whether the unsuccessful transmission is attributed to a frame collision is computed based on the received negative acknowledgement.

19. The non-transitory computer readable medium of claim 16, wherein if the unsuccessful transmission is attributed to a frame collision, then determining the second backoff period based on a contention window.

20. The non-transitory computer readable medium of claim 19, wherein the contention window is increased in an exponential manner.

21. The method of claim 1, further comprising detecting a channel error in one or more receiving frames in each of the plurality of time slots, and wherein the channel condition is estimated by computing a least mean squares of the lengths of consecutive error time slots and a variance of the least mean squares.

22. The method of claim 6, wherein determining a second backoff period based on at least the estimated channel condition comprises adding the mean to the variance multiplied by a particular number X according to a formula: second backoff period=mean+X*variance.

23. The method of claim 22, further comprising determining the particular number X by subtracting a value representing an order of a time slot that is used for the unsuccessful transmission in the consecutive error time slots from the mean.

* * * * *